United States Patent [19]

Penneck et al.

[11] 4,189,392
[45] Feb. 19, 1980

[54] TRACKING RESISTANT HV INSULATION MATERIAL CONTAINING FLUORINE-SUBSTITUTED COMPONENT TO INHIBIT EROSION

[76] Inventors: Richard J. Penneck, "Treeve," Westway, Lechlade, Gloucestershire; John M. Senior, 70 Caulfield Rd., Swindon, Weltshire, both of England

[21] Appl. No.: 819,165

[22] Filed: Jul. 26, 1977

[30] Foreign Application Priority Data

Aug. 3, 1976 [GB] United Kingdom ............... 32271/76

[51] Int. Cl.$^2$ .......................... H01B 3/46; H01B 3/44; H01B 3/42; H01B 3/40
[52] U.S. Cl. ............................. 252/63.2; 174/110 SR; 174/110 FC; 174/137 B; 174/DIG. 1; 252/63.5; 252/63.7; 252/66
[58] Field of Search .................. 252/63.2, 63.5, 66, 252/63.7; 174/137 B, DIG. 1, 110 SR, 110 FC; 200/144 C, 151; 260/29.1 SB, 37 EP, 37 SB

[56] References Cited

U.S. PATENT DOCUMENTS

| | | | |
|---|---|---|---|
| 2,997,526 | 8/1961 | Kessel et al. | 174/137 B |
| 2,997,527 | 8/1961 | Kessel et al. | 174/137 B |
| 2,997,528 | 8/1961 | Kessel et al. | 174/137 B |
| 3,006,878 | 10/1961 | Talcott | 260/29.1 SB |
| 3,086,242 | 4/1963 | Cook et al. | 264/95 |
| 3,356,791 | 12/1967 | McGowan | 174/137 B X |
| 3,787,351 | 1/1974 | Olson | 260/37 EP X |
| 3,838,055 | 9/1974 | Rinehart | 252/63.2 |
| 3,925,297 | 12/1975 | Sprengline | 260/37 N X |
| 3,969,308 | 7/1976 | Penneck | 174/DIG. 1 X |
| 4,055,504 | 10/1977 | Heumann et al. | 252/63.2 |

FOREIGN PATENT DOCUMENTS 1303432   1/1973   United Kingdom .
1337951  11/1973   United Kingdom .
1337952  11/1973   United Kingdom .

*Primary Examiner*—Harris A. Pitlick
*Attorney, Agent, or Firm*—Lyon & Lyon

[57] ABSTRACT

An electrical insulating material having anti-tracking properties has incorporated therein an erosion inhibiting fluorine-substituted compound. The electrical insulating material comprises a polymeric material having an anti-tracking filler and the fluorine-substituted compound is a hydrophobic, non-ionic compound having a fluorine-substituted aliphatic carbon chain linked to a group having an affinity for the polymeric material and/or the anti-tracking filler. The electrical insulating material may be used in high voltage applications where it is necessary to resist erosion and/or control leakage currents.

60 Claims, No Drawings

TRACKING RESISTANT HV INSULATION MATERIAL CONTAINING FLUORINE-SUBSTITUTED COMPONENT TO INHIBIT EROSION

This invention relates to high voltage insulation materials.

Whilst polymeric materials are widely used for insulating a variety of electrical apparatus, they are not suitable for high voltage applications in contaminated atmospheric conditions where deposited moisture, together with salts, dust particles and ionic pollution, encourage leakage currents to flow across the surface of the insulation. These leakage currents cause a rise in temperature of the polymeric material with consequent moisture evaporation and ultimately dry band formation. The electrical stress across the dry bands often exceeds the breakdown stress of the air insulation interface, so that discharge or spark scintillation takes place. The repeated effect of such a discharge or spark scintillation causes the insulation to fail, either by progressive creepage tracking or by spark erosion. It is known that polymeric insulation materials can be rendered highly resistant to tracking by the use of certain particulate inorganic fillers. For example it is known from U.S. Pat. Nos. 2997526, 2997527 and 2997528, the disclosures of which are incorporated herein by reference, that polymeric insulating materials can be rendered highly resistant to tracking by the use of alumina trihydrate as an anti-tracking filler. Further improvements can be made by the incorporation of, in addition to the alumina trihydrate, a chemically-treated silica filler, as described in British Pat. No. 1303432, or a transition metal oxide as described in British Pat. Nos. 1337951 and 1337952. These latter materials are substantially non-tracking, but in the most severe, polluted environments leakage currents tend to be rather high and there are still incidences of failure due to spark erosion. The disclosures of British Pat. Nos. 1303432, 1337951 and 1337952 are incorporated herein by reference. It is further known from British Pat. No. 1037930 to provide a moulding composition for forming into an arc exposure surface of a moulded electrical insulating element, which comprises a polymeric binder, hydrated alumina and an arc-interrupting additive which may be, for example, a halogenated hydrocarbon. However, the physical requirements for an arc-interrupting composition are quite different from those of an anti-tracking and erosion resistant material, and the compositions disclosed in British Pat. No. 1037930 are not suitable for use in high voltage applications in polluted environments. U.S. Pat. No. 3925297 describes a composition, suitable for use in the manufacture of printed circuit boards, which comprises an organic resin, a non-conductive filler and a surfactant having a perfluorinated chain at least three carbon atoms long at one end and a polar group at the other end. The presence of the surfactant is stated to decrease the drop in volume resistivity which occurs in high humidity environments, but again the compositions described are not suitable for use in high voltage applications.

It has now been found that the incidence of spark erosion in polymeric insulating materials having anti-tracking properties may be reduced by the incorporation of certain non-ionic fluorine-substituted compounds into the material.

Accordingly the present invention provides an electrical insulating material suitable for high voltage applications which comprises a polymeric material having incorporated therein an anti-tracking filler and an erosion inhibiting, hydrophobic, non-ionic, fluorine-substituted compound, the compound having a fluorine-substituted aliphatic carbon chain linked to a group having an affinity for the polymeric material and/or the anti-tracking filler.

The invention also provides a composition suitable for processing, for example by moulding or extrusion, into an insulating material according to the invention, and an electrical component protected by an insulating material according to the invention.

Polymeric materials suitable for use in the present invention may include resins and elastomers comprising, for example, polyolefins and olefin copolymers such as polyethylene, polypropylene, ethylene/propylene copolymers, ethylene/propylene/non-conjugated diene terpolymers, polybutene, polyisobutylene, polynorbornene (Norsorex manufactured by C.d.F.), butyl rubbers and substituted polyolefins such as chlorosulphonated polyethylene; copolymers of olefins and other unsaturated monomers, for example olefin/unsaturated ester copolymers such as ethylene/ethyl acrylate and methacrylate polymers; acrylic rubbers such as polybutyl acrylate, butyl acrylate/ethyl acrylate copolymers, and butyl acrylate/glycidyl methacrylate copolymers; silicone polymers such as polymonoorganosiloxanes for example polymonomethylsiloxane and polymonoethylsiloxane, polydiorganosiloxanes such as polydimethylsiloxane, copolymers of mixed organosiloxanes, such as copolymers, block copolymers and terpolymers of monomethylsiloxane, dimethylsiloxane and methylvinylsiloxane, fluorosilicones for example those derived from 3,3,3,-trifluoropropyl siloxane and carborane siloxanes for example "Dexsil" polymers manufactured by Olin Matheson; epoxy resins such as those based on cycloaliphatic epoxides, for example CY183 and CY185 manufactured by CIBA Geigy (A.R.L.) limited, cycloaliphatic glycidyl polyethers, polyesters and polynuclear phenols such as 4,4'dihydroxy-diphenyl-dimethylmethane and epoxy novolaks; polyurethanes, particularly castable elastomeric polyurethanes; and polyethers such as epichlorohydrin rubbers. Blends of the above mentioned elastomers and resins may also be used. Particularly good results have been obtained using polyolefins, olefin copolymers, cycloaliphatic epoxy resins and silicone polymers, and these are the preferred polymeric materials for use in the present invention.

For certain applications, and in particular in the manufacture of heat-recoverable articles, it is desirable to crosslink the polymeric material, for example by irradiation, or by the use of chemical crosslinking agents, for example peroxides. A suitable method for the production of heat-recoverable articles is described in U.S. Pat. No. 3086242, the disclosure of which is incorporated herein by reference.

The anti-tracking filler incorporated in the polymeric material may for example comprise an inorganic metal oxide, hydroxide or salt, or mixtures thereof. Suitable oxides, hydroxides and salts include, for example, alumina, hydrates of alumina, magnesia, hydrates of magnesia, and barium sulphate. Hydrates of alumina are preferred, and in particular excellent results have been obtained using α-alumina trihydrate. The anti-tracking filler preferably has a high specific surface area, desirably at least 1m$^2$/g as measured by the Brunauer, Emmett and Teller (BET) nitrogen absorption method. The anti-tracking filler most preferably has a specific surface area of from about 5 to 50 m$^2$/g. The particle size of the anti-tracking filler is preferably less than 5 microns, and most preferably less than 2 microns. The anti-tracking filler included in the polymeric material may comprise other adjuvants, to give an anti-tracking filler system giving excellent protection against tracking. Such an adjuvant may comprise for example, an oxide, a mixed oxide, or a mixture of oxides, which oxide, mixed oxide, or mixture of oxides contains at least one element from the transition elements, the lanthanide series or the actinide series as described in British Pat. Nos. 1337951 and 1337952, and/or a chemically treated silica filler comprising an inorganic silicon-containing compound containing the Si-O-Si group which has been treated with one or more silanes as described and claimed in British Pat. No. 1303432.

The polymeric material preferably comprises a sufficient amount of the anti-tracking filler or filler system to have an initial tracking voltage of at least about 2.5 kV, advantageously 3.5 kV or greater, as measured by the inclined plane test of Mathes and McGowan according to the American Society for testing and materials (ASTm D2303). In this test a sample of material is mounted at 45° to the horizontal with two electrodes attached to its underside 50 mm apart. Contaminant in the form of a solution of ammonium chloride having a volume resistivity of 380 ohm cm and containing 0.02% of the wetting agent Triton X100, flows at a controlled rate from the upper to the lower electrodes. (Triton X100 is t-Octyl phenoxypoly (ethylene oxy) ethanol containing about 9–10 moles of ethylene oxide). This test is typically commenced at 1.5 kV and the voltage is increased by 0.26 kV per hour until failure occurs. Usually the anti-tracking filler or filler system is incorporated in the polymer material in an amount of at least 15% by weight, based on the total weight of the polymeric material and the filler or filler system, and preferably in an amount of from 20 to 90% by weight, such as for example about 30% by weight.

As previously stated, the erosion inhibiting, hydrophobic, non-ionic, fluorine-substituted compound is a compound having a fluorine-substituted carbon chain linked to a group having an affinity for the polymeric material and/or the anti-tracking filler, that is to say the group is either compatible with the polymeric material so as to render the compound soluble in, or miscible with, the polymeric material, or at least not readily leached out therefrom, or capable of interacting with the surface of the anti-tracking filler so as to form a layer, and preferably a mono-layer, thereon.

Although the invention is not limited to any particular theory, it is believed that the molecules of the fluorine-substituted compound tend to orientate themselves, and in some cases to migrate, toward the surface of the electrical insulating material over a period of time, thereby rendering the surface of the electrical insulating material more hydrophobic and resistant to contamination. At the same time, because part of the molecule of the fluorine-substituted compound has a relatively greater affinity for the polymeric material and/or the anti-tracking filler, the molecules tend to orientate themselves at the surface such that the fluorine-substituted carbon chains lie on or near the surface and the groups having an affinity for the polymeric material and/or the anti-tracking filler are held within the polymeric material, or by the filler, such that the possibility of leaching of the fluorine-substituted compound from the electrical insulating material is reduced.

The fluorine-substituted aliphatic carbon chain usually comprises at least four carbon atoms and preferably comprises from 6 to 18 carbon atoms, more preferably from 6 to 10 carbon atoms. Preferably the fluorine-substituted aliphatic carbon chain is a fluorinated alkyl group, especially a straight chain alkyl group, for example a hexyl, heptyl, octyl, nonyl or decyl group. It is desirable that at least the terminal carbon atom of the alkyl group should carry at least two fluorine atoms, and preferably three. Preferably at least the carbon atom of the fluorine-substituted aliphatic carbon chain adjacent to the link with the group having an affinity for the polymeric material and/or the anti-tracking filler is unsubstituted, i.e. is a —CH$_2$—group. Especially preferred are those compounds in which the two carbon atoms of the chain adjacent to the link are unsubstituted. The fluorine substituted compound may carry more than one fluorine-substituted aliphatic carbon chain and for example the compound may comprise two fluorine-substituted aliphatic carbon chains linked to a divalent group having an affinity for the polymeric material and/or the anti-tracking filler.

The flourine-substituted carbon chain may be linked directly to the group having an affinity for the polymeric material and/or the anti-tracking filler, for example through a covalent carbon-carbon bond, or may be linked through an alkoxy, acyl, amide or ester linkage. Ester linkages are particularly preferred. The nature of the group having an affinity for the polymeric material and/or the anti-tracking filler will of course depend upon the polymeric material into which the fluorine-substituted compound is to be incorporated and the filler used. Where the group has an affinity for the polymeric material, it may for example, contain atomic groupings similar to those in the polymeric material. Thus for example where the polymeric material comprises a polyolefin or an olefin copolymer, the group having an affinity for the polymeric material may comprise a carbon chain containing up to about 100 carbon atoms, preferably 3 to 20 carbon atoms. When the polymeric material comprises an acrylate or methacrylate polymer, the group preferably contains polar moieties, for example ester, ether or amide groups. Similarly for epoxy resins, polyurethanes, polyethers and epichlorohydrin rubbers, groups containing epoxide, urethane or ether linkages may be used as appropriate. When the polymeric material comprises a silicone polymer, the group preferably contains one or more silicon atoms bonded to oxygen, carbon halogen, nitrogen or hydrogen, for example the group may contain one or more siloxane linkages, or a polysiloxane chain containing up to about 40, and preferably from 4 to 30, siloxane linkages. The group having an affinity for the polymeric material may comprise more than one of the groups and linkages listed above if desired.

Examples of particularly suitable groups which may be used in fluorine-substituted compounds incorporated in polyolefins, and olefin copolymers, include monoester groups for example laurate, stearate, amylate, n-C$_5$H$_{11}$O.CO-, n-C$_{12}$H$_{25}$O.CO and n-C$_{18}$H$_{37}$O.CO-, diester groups for example azelate, and triester groups for example citrate; for silicone polymers, there may be used siloxane-containing groups for example

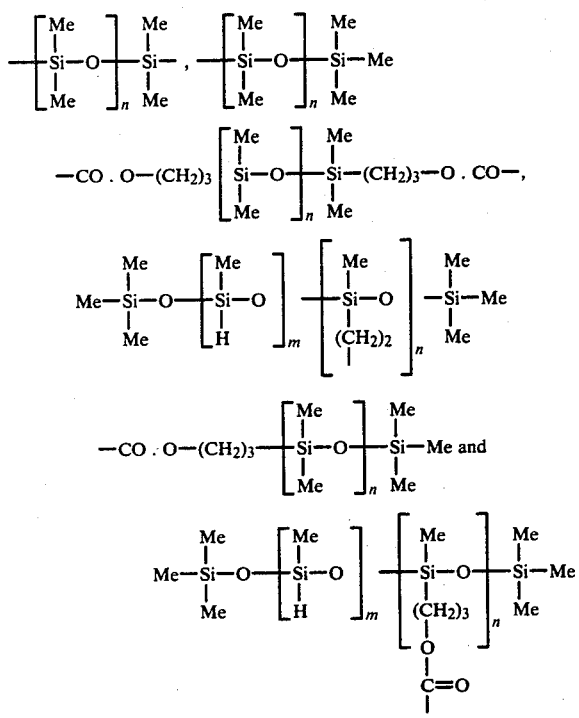

where m is 0 or an integer of from 1 to 30, and n is an integer of from 4 to 30.

Where the fluorine-substituted compound comprises a group having an affinity for the anti-tracking filler this is preferably a group which hydrolyses, or may be hydrolysed, in the presence of the anti-tracking filler to form a covalent or ionic bond therewith, or become absorbed thereon, for example a hydrolysable silicone or siloxane group, or a hydroxyl-containing group, for example a hydroxy alkyl, or hydroxy ester group or an amine or carboxyl-containing group. An example of a particularly preferred group having an affinity for the anti-tracking filler is the citrate group. Of course in appropriate instances the fluorine-substituted compound may comprise a group having an affinity both for the polymeric material and the anti-tracking filler, or may comprise two groups, one having an affinity for the polymeric material and the other having an affinity for the anti-tracking filler.

When selecting a fluorine-substituted compound for any particular application, it is important to maintain a balance between the fluorine-substituted aliphatic carbon chain and the group having an affinity for the polymeric material and/or the anti-tracking filler, such that neither is so long, or so bulky, as to mask the effect of the other when the compound is incorporated in the polymeric material. Desirably they should not differ substantially in molecular weight, and preferably their molecular weight ratio is from 2:1 to 1:2.

Examples of particularly suitable fluorine-substituted compounds for use in polyolefins and olefin copolymers, include the esterification products of fluoroaliphatic alcohols and aliphatic acids, such as for example the esters of $CF_3(CF_2)_5$—$CH_2OH$, $CF_3(CF_2)_6$-$CH_2OH$ and $Rf\ CH_2\ CH_2\ OH$, where $Rf$ is a perfluorinated $C_4$-$C_6$ alkyl group, with azelaic, citric lauric and stearic acids. Esters of fluorinated aliphatic acids as higher alcohols for example above about $C_6$, are not preferred because these frequently contain traces of the unreacted acid which are difficult to remove and which may give rise to ionic species having a deleterious effect upon the electrical properties of the electrical insulating material. Fluorine-substituted aliphatic compounds having olefinic unsaturation, can be used if desired.

Among the suitable fluorine-substituted compounds for use with silicone polymers there may be mentioned siliconised esters of fluoroalkanoic acids having the general formula

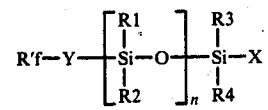

Where R'f is a fluorinated alkyl group, preferably a perfluorinated alkyl group, containing from 6 to 18 carbon atoms; Y is an ester group such that the Y—Si linkage is a carbon-silicon bond; X is an alkyl group containing from 1 to 6 carbon atoms, or —Y—R'f; R1, R2, R3 and R4 are lower alkyl groups which may be the same or different containing up to 6, preferably from 1 to 3, carbon atoms; and n is an integer of from 4 to 30.

The preferred compounds are those in which Y represents the group —CO.O—(CH₂)x— in which x is an integer of from 2 to 5 and particularly the siliconised allyl esters of perfluoroalkanoic acids of the general formula:

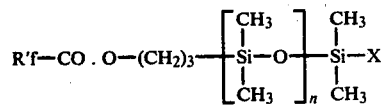

Where R'f and n have the meanings previously ascribed thereto and X is —CH₃ or —(CH₂)₃—O.-CO—R'f. Exemplary of such compounds is that in which R'f represents CF₃ (CF₂)₆— and n represents 12.

A further group of siliconised compounds suitable for use in silicone polymers according to the present invention includes those of the general formula:

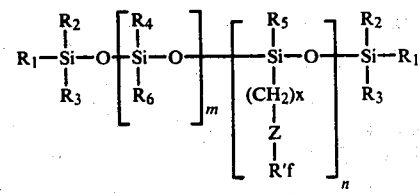

Where R₁ to R₅ are lower alkyl groups which may be the same or different containing up to 6 carbon atoms, peferably methyl groups, R₆ is a hydrogen atom or a lower alkyl group containing up to 6 carbon atoms, Z is a divalent linking group for example an ester, amide or ether group, m is 0 or an integer of from 1 to 30, and n, x R'f have the meanings previously ascribed thereto. Illustrative of such compounds is the compound of formula:

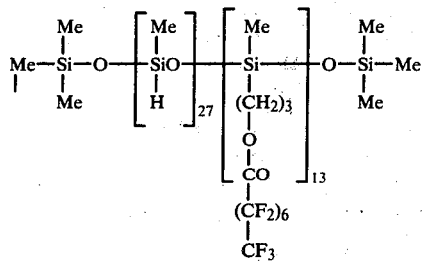

The siliconised esters may be made, for example, by reaction of an appropriate unsaturated fluorinated ester of a fluoro olefin with a silane or siloxane having an Si-H group in the presence of a hydrosilylation catalyst, for example chloroplatinic acid $H_2PtCl_6$. The unsaturated fluorinated ester may be made by reaction of an unsaturated acid or alcohol with an appropriate perfluoro alcohol or acid respectively. The siliconised esters may also be useful in non-silicone polymers.

A still further group of fluorine-substituted compounds for use with silicone polymers includes fluorinated silanes and siloxanes of the general formula $R''f\ CH_2.CH_2-A$ where A is a silane or siloxane group linked to the fluorine-containing carbon chain by a C—Si bond. Examples of such compounds include:

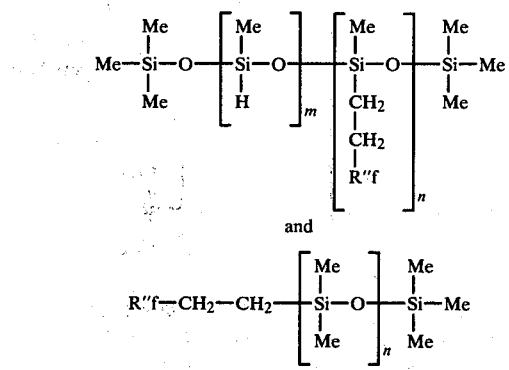

where $R''f$ is a fluorinated alkyl group, preferably a perfluorinated alkyl group, comprising from 2 to 16 carbon atoms and m and n are as previously defined.

These compounds may be made, for example, by reaction of an appropriate fluoro-olefin with a silane or siloxane in the presence of a hydrosilylation catalyst.

The fluorine-substituted compound is preferably used in an amount sufficient to render the surface of the insulating material substantially hydrophobic, that is to say that the surface after aging preferably has an equilibrium contact angle with water of not less than 90°, preferably not less than 100° and most preferably greater than 110°. Usually only small quantities, less than 3% in most cases, of the fluorinated compounds are necessary, and preferably there are used amounts in the range of from 0.01 to 2% based upon the weight of the polymer material. Mixtures of fluorine-substituted compounds may of course be used if desired and may be advantageous in some cases, for example fatty acid esters of mixed fluorinated alcohols give excellent results.

The fluorine-substituted compound may be incorporated into the polymeric material in any convenient manner, for example the fluorine-substituted compound and the anti-tracking filler or filler system may simply be blended into the polymer material in the appropriate proportions. In other cases it may prove advantageous first to coat the anti-tracking filler or filler system with the fluorine-substituted compound for example by tumbling, ball milling, or solvent slurry techniques and then to blend the coated filler into the polymeric material. The blending may be carried out in conventional mixing or extrusion equipment, or both, as appropriate for the polymeric material being processed. In the case of casting resins, the filler and the fluorine-substituted compound may simply be mixed with one or both components of the resin system. The polymeric material is then moulded, for example by transfer or injection moulding, extruded, or cast, for example by low pressure casting or under atmospheric pressure, as appropriate, into the desired shape and crosslinked if necessary. Certain of the fluorine-substituted compounds, in particular those having olefinic unsaturation, for example, the allyl esters of fluoroalkanoic acids, may be covalently bound to the polymeric material, for example by the use of irradiation, free radical initiators or other suitable methods, and in appropriate cases this may conveniently be carried out simultaneously with the crosslinking of the polymeric material.

The insulating material and compositions of the present invention may, if desired, contain other fillers, for example reinforcing fillers and pigmenting fillers, antioxidants, U.V. stabilisers, crosslinking agents, flame retardants, processing aids, plasticisers and mixtures thereof. Small amounts of carbon black, normally deleterious in high voltage insulating materials, may be incorporated without significant adverse effect, as a pigment or as a U.V. stabiliser.

The electrical insulating materials of the present invention may be used in a great many applications where it is necessary to resist erosion and/or control leakage currents, and are particularly useful in electrical components exposed to voltages above 1 kV. Thus they find application in electrical power transmission systems, for example, as insulation materials for high voltage components, insulators of all types, particularly for cable terminations, fuse covers, transformer covers, bushings, sheds and booster sheds, and insulation adhesives, coatings, varnishes and tapes. A particular application which may be mentioned is the provision of an insulating material which may be recovered, for example by mechanical means, by the use of a solvent, or by the application of heat, so as to form a close fit over a cable connection or termination. Such shrinkable materials, may be formed into heat-shrinkable tubes, udders, sheds, end-caps and other shapes known to the art.

The invention is illustrated by the following Examples:

EXAMPLE 1

This example describes a number of insulating materials according to the invention and gives a comparison of their electrical performance with control materials containing, in one case, no fluorinated compound, and in the other an ionic fluorinated compound.

The following formulation was prepared in a twin roll mill (all parts are by weight):

| | |
|---|---|
| Ethylene-propylene-dicylopentadiene terpolymer | 17.3 |
| Low density polyethylene (Melt flow index 3) | 17.3 |
| Alumina trihydrate (surface area 16.3 m²/g) | 17.3 |

| | |
|---|---|
| Cobalt aluminate (Bayer light blue 2R) | 5.2 |
| Irganox 1010 antioxidant | 0.71 |

The formulation was then blended with a composition as follows:

| | |
|---|---|
| Fluorine-substituted compound | 0.60 |
| Triallylcyanurate | 0.35 |
| 2.5 dimethyl - 2.5 di-t-butyl peroxy hexyne-3 | 0.85 |

The following fluorine-substituted compounds were used:
1. Perfluoro telomer stearate (TLF 2967 or TLF 4325 manufactured by Du Pont). Believed to be the stearic acid ester of Rf $CH_2$-$CH_2OH$ where Rf is mainly $C_4$-$C_6$ perfluoroalkyl.
2. Perfluoro telomer laurate (MPD 3706 manufactured by Du Pont). Believed to be the lauric acid ester of Rf $CH_2CH_2OH$ where Rf is mainly $C_4$-$C_6$ perfluoroalkyl.
3. Perfluoro telomer citrate (TLF 4326 or Zonyl TBC manufactured by Du Pont.) Believed to be the citric acid triester of Rf $CH_2CH_2OH$ where Rf is mainly $C_4$-$C_6$ perfluoroalkyl.
4. Perfluoro telomer azelate (MPD 3712 manufactured by Dy Pont). Believed to be the azelaic acid ester of Rf $CH_2CH_2OH$ where Rf is mainly $C_4$-$C_6$ perfluoroalkyl.
5. Potassium perfluoroalkyl sulphonate (FC98 manufactured by 3M) (anionic fluorinated compound).

After thoroughly mixing all components, plaques 12.7×12.7×0.13cm and moulded parts of dimensions 5×12.5×0.6 1 cm were pressed from each batch by compression moulding at 190° C. for ten minutes. The hydrophobic nature of the surface of the samples was then measured by the following method:

Contact Angle Measurement

The contact angle was measured by the sessile drop technique. The water was purified by distillation and its surface tension checked by the du Nouy ring method. Drops of water about 2mm in diameter were applied from a syringe to the surface of the sample under test and the contact angle was measured approximately 30 seconds later using a telescope fitted with a goniometer eyepiece (Rame-Hart contact angle goniometer).

High Voltage Test

Samples of length 13 cms and diameter 1 cm were moulded as before and degreased then painted at each end with silver paint so as to leave a central section of 7.5 cms uncoated. The samples were placed in a humidity chamber at greater than 95% RH and subjected to a voltage of 6.7 kV (rms). Whilst in the humidity chamber the samples were subjected to temperature cycling from 29° C. to 41° C. with a cycle duration of 67 minutes. After a period of at least 9 days in the humidity chamber the samples were removed and left in the open air for 15 minutes. The samples were then placed in a freezer at −5° C. for at least five hours and returned to the humidity chamber set at 25±2° C. and greater than 95% RH. Within one minute of removal from the freezer the samples were subjected to a dielectric test which consisted of the application of a constant voltage of 3.7 kV upon which there were superimposed at 5 minute intervals 30 second pulses of 12.5 kV, 12.5 kV, 16 kV, 16 kV and 20 kV (rms voltages).

Finally the samples were subjected to a constant voltage of 20 kV for 5.5. minutes. Whilst the voltages were applied the current flowing through or over the samples was monitored and fed to a UV recorder and oscilloscope. Table 2 below gives the mean current flowing at the end of the first 30 second excursion to 12.5 kV. The other criterion of performance of the samples was the time in the humidity chamber until resistive currents flowed over the sample during the dielectric test and these results are given in Table 1. The resistive currents were due to the formation of a wet surface film. The currents on non-wetting materials were capacitive.

Results

Contact Angle Measurement

Contact angle measurements were made two days, seven days and twenty eight days after moulding the samples. The results are as follows:

| | Contact Angle | | |
|---|---|---|---|
| Compound | 2 days | 7 days | 28 days |
| Control (no fluorinated compound) (average of four) | 95 | 94 | 94 |
| 1 | 127 | 129 | 139 |
| 2 | 107 | 108 | 111 |
| 3 | 98 | 97 | 96 |
| 4 | 101 | 98 | 101 |
| 5 | 95 | 98 | 94 |

High Voltage

Compounds arranged in descending order of performance as assessed by time in humidity chamber until resistive currents flowed.

Table 1

| Compound | Minimum time in humidity chamber until resistive currents flowed during dielectric test (days) |
|---|---|
| 1 | >63 |
| 2 | >63 |
| 3 | 63 |
| 4 | 63 |
| control | 18 |
| 5 | 9 |

Compounds arranged in descending order of performance based on current at end of first 30 second excursion to 12.3 kV.

Table 2

| Compound | Mean Current μA |
|---|---|
| 3 | 2.9 |
| 4 | 3.1 |
| 2 | 3.4 |
| 1 | 3.7 |
| Control | 13.9 |
| 5 | 263 |

Conclusion

These results show that there is a close correlation between the hydrophobic nature of the surface, as measured by contact angle with water, produced by addition of the non-ionic amphipathic fluorine-substituted compound and the electrical performance of the samples. By comparison, the anionic fluorine-substituted compound though producing a marginal improvement in contact angle with water, is inferior in electrical performance to the control without any additive.

EXAMPLE 2

This Example describes further insulating materials according to the invention and gives a comparison of their electrical performance with control materials.

The following formulations were prepared in a twin roll mill (all parts by weight):

| Samples 1.1–3.2 | |
|---|---|
| Polydimethyl siloxane elastomer containing 27% by weight of surface treated silica filler | 120 |
| Low density polyethylene (melt flow index 3) | 120 |
| Ethylene/ethylacrylate copolymer containing 18 molar % ethyl acrylate units | 120 |
| Alumina trihydrate (surface area 16.3 m²/g) | 120 |
| Red iron oxide | 20 |
| Aegerite Resin D antioxidant | 8 |

The formulation was then blended with a composition as follows:

| | |
|---|---|
| Fluorine substituted compound | 5.2 |
| Triallylcyanurate | 4 |
| 2.5 dimethyl-2, 5 di-t-butyl peroxy hexyne-3 | 4 |

The following fluorine substituted compounds were used:

Control (no additive)     1.

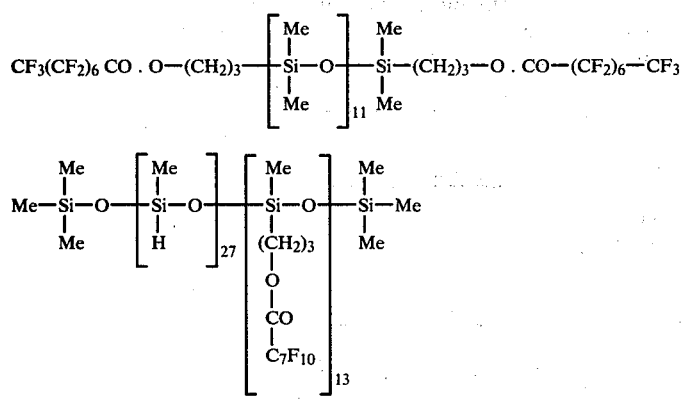

2.

3.

Two samples of each composition were made up by moulding or extruding tubes of the compositions, the tubes having an internal diameter of 15 mm and wall thickness 3 mm, expanding tubes on a mandrel at 160° C. to an internal diameter of 2.54 cm, then recovering the tubes onto sealant coated glass rods 125 mm in length and diameter 16 mm by heating with a flame gun, and placing the samples in an oven at 160° C. for 15 minutes. After cooling, electrodes were attached to each end of the samples so as to give an active material length between the electrodes of 75 mm. The samples were degreased, allowed to age for 5 days, and then electrically tested as follows:

Humidity Cycle Test

The samples were placed in a humidity chamber at room temperature and 40% relative humidity. The relative humidity in the chamber was increased to greater than 95% and the samples continuously stressed at 7 kV a.c. 50 Hz. The air temperature in the chamber was cycled from 30° C. to 45° C. in 20 minutes and then back to 30° C. in a further 20 minutes. After 700 cycles the samples were taken out of the chamber, allowed to dry, and inspected for surface discoloration.

Post Cycle Test

The relative humidity in the chamber was again increased to greater than 95% and a further 5 temperature cycles made. The temperature of the chamber was then allowed to stabilise at 25° C. and the samples subjected to a 10 kV a.c. 50 Hz stress for 3 minutes. The average leakage current and phase angle were measured.

Voltage Test After Freezing

The samples were taken out of the chamber, allowed to dry for 15 minutes, and placed in a freezer at −5° C. for a minimum of 5 hours. They were then placed in the humidity chamber at 25° C. and greater than 90% relative humidity. Within 30 seconds of their removal from the freezer the samples were subjected to a voltage step test which consisted of the application of a constant voltage of 7 kV, 50 c.p.s., upon which there were superimposed at 5 minutes intervals 30 second steps of 10 kV, 12.5 kV, 15 kV and finally a 60 second step of 20 kV (rms voltages). The current flowing through or over the samples was monitored and fed to a U.V. recorder and oscilloscope. The results were expressed in terms of the number of current pulses, out of a total of 15000 pulses, having peaks falling within specified ranges. Also measured were the flashover voltage, the time to flashover and the voltages to which the sample was being raised at the time of flashover.

The results are given in Table 3.

The results in table 3 show that the use of fluorine-substituted compounds in accordance with the invention in silicone-containing insulating materials produces a substantial improvement in electrical properties under severe conditions of testing. In particular the leakage currents are substantially more capacitative and the flashover voltage is greatly improved.

TABLE THREE

| SAMPLE No. | POST CYCLE 10 kV Wet Test | | | VOLTAGE STEP TEST AFTER FREEZING | | | | | | Flash-Over Voltage | Time to Flash Over | Voltage to which the Sample was being raised at time of F.O |
|---|---|---|---|---|---|---|---|---|---|---|---|---|
| | % Surface Discolouration | I in μ Amps | Phase Angle | I Peak 2mA | I Peak 5mA | I Peak 10mA | I Peak 20mA | I Peak 40mA | I Peak 40+mA | | | |
| 1.1 | 30 | 40 | 38.5 | 15000 | 2750 | 750 | | | | 8 kV | 5 mins | 10 kV |
| 1.2 | 50 | 108 | 21.5 | 15000 | 7500 | 1500 | | | | 8 kV | 5 mins | 10 kV |
| 2.1 | 2 | 25 | 79.5 | 15000 | 2000 | | | | | 12.5 kV | 10 mins | 12.5 kV |
| 2.2 | 7 | 22 | 70.5 | 15000 | 2000 | | | | | 10 kV | 5 mins | 10 kV |
| 3.1 | 15 | 31 | 79.5 | 15000 | 4500 | | | | | 9.75 kV | 5 mins | 10 kV |
| 3.2 | 10 | 32 | 76.5 | 15000 | 5000 | 5000 | | | | 10 kV | 10 mins | 10 kV |

We claim:

1. An electrical insulating material suitable for high voltage applications which is resistant to tracking and spark erosion comprising a polymeric material having incorporated therein an anti-tracking filler and an erosion inhibiting, hydrophobic, non-ionic, fluorine-substituted compound, the compound having at least one fluorine-substituted aliphatic carbon chain linked to a group having an affinity for the polymeric material and/or the anti-tracking filler, said group being selected from groups compatible with said polymeric material so as to render the compound soluble in said polymeric material, miscible with said polymeric material, or resistant to leaching from said polymeric material and groups capable of interacting with the surface of the anti-tracking filler to form a layer thereon, said material having initial tracking voltage of at least 2.5kV as measured by ASTM D2303.

2. An electrical insulating material according to claim 1, in which the polymeric material comprises a polyolefin, an olefin copolymer, a substituted polyolefin, an acrylic rubber, a silicone polymer, an epoxy resin, a polyurethane or a polyether.

3. An electrical insulating material according to claim 2 wherein said olefin copolymer is an olefin/unsaturated ester copolymer.

4. An electrical insulating material according to claim 1, in which the polymeric material is crosslinked.

5. An electrical insulating material according to claim 1, in which the polymeric material is heat recoverable.

6. An electrical insulating material according to claim 1, in which the anti-tracking filler comprises an inorganic metal oxide, hydroxide or salt, or a mixture thereof.

7. An electrical insulating material according to claim 6, in which the anti-tracking filler is a hydrate of alumina.

8. An electrical insulating material according to claim 7, in which the anti-tracking filler is α alumina trihydrate.

9. An electrical insulating material according to claim 1, in which the anti-tracking filler has a specific surface area of from 5 to 50 m²/g.

10. An electrical insulating material according to claim 1, in which the anti-tracking filler includes an adjuvant which comprises an oxide, mixed oxide, or mixture of oxides, which oxide, mixed oxide, or mixture of oxides contains at least one element from the transition elements, the lanthanide series, or the actinide series.

11. An electrical insulating material according to claim 1, in which the anti-tracking filler is present in an amount of from 20 to 90% by weight, based on the total weight of the polymeric material and the filler.

12. An electrical insulating material according to claim 1, in which the fluorine-substituted compound comprises a fluorine-substituted aliphatic carbon chain having from 6 to 18 carbon atoms.

13. An electrical insulating material according to claim 12, in which the fluorine-substituted aliphatic carbon chain is a fluorinated alkyl group.

14. An electrical insulating material according to claim 12, in which the fluorine-substituted aliphatic carbon chain comprises a $CH_2$-group adjacent to the link with the group having an affinity for the polymeric material and/or the anti-tracking filler.

15. An electrical insulating material according to claim 12, in which the fluorine-substituted aliphatic carbon chain has a terminal carbon atom carrying three fluorine atoms.

16. An electrical insulating material according to claim 1, in which the fluorine-substituted carbon chain is linked directly to the group having an affinity for the polymeric material and/or the anti-tracking filler.

17. An electrical insulating material according to claim 1, in which the fluorine-substituted carbon chain is linked to the group having an affinity for the polymeric material and/or the anti-tracking filler through an alkoxy, acyl, amide or ester linkage.

18. An electrical insulating material according to claim 1, in which the polymeric material comprises a polyolefin, or an olefin copolymer, and the group having an affinity for the polymeric material comprises a carbon chain containing from 3 to 20 carbon atoms.

19. An electrical insulating material according to claim 1 in which the polymeric material comprises an acrylate or methacrylate polymer and the group having an affinity for the polymeric material comprises an ester, ether, or amide group.

20. An electrical insulating material according to claim 1, in which the polymeric material comprises a silicone polymer, and the group having an affinity for the polymeric material comprises a silicon atom bonded to oxygen, carbon, a halogen, nitrogen or hydrogen.

21. An electrical insulating material according to claim 20, in which the group having an affinity for the polymeric material comprises a siloxane linkage, or a polysiloxane chain containing from 4 to 30 siloxane linkages.

22. An electrical insulating material according to claim 1 in which the group having an affinity for the anti-tracking filler is a group which hydrolyses, or may be hydrolysed, in the presence of the anti-tracking filler.

23. An electrical insulating material according to claim 22, in which the group having an affinity for the anti-tracking filler is a hydroxyl, alkyl or hydroxy ester group, or an amine or carboxyl containing group.

24. An electrical insulating material according to claim 23, in which the group having an affinity for the anti-tracking filler is a citrate group.

25. An electrical insulating material according to claim 1 in which the molecular weight ratio of the fluorine-substituted aliphatic carbon chain to the group having an affinity for the polymeric material and/or the anti-tracking filler is from 2:1 to 1:2.

26. An electrical insulating material according to claim 1 in which the fluorine-substituted compound is an ester of a fluoroaliphatic alcohol and an aliphatic acid.

27. An electrical insulating material according to claim 26, in which the fluorine-substituted compound is an ester of $Rf\ CH_2CH_2.OH$ where Rf is a perfluorinated $C_4$-$C_6$ alkyl group, wth azelaic, citric, lauric or stearic acid.

28. An electrical insulating material according to claim 1 in which the fluorine-substituted compound is a compound of the formula:

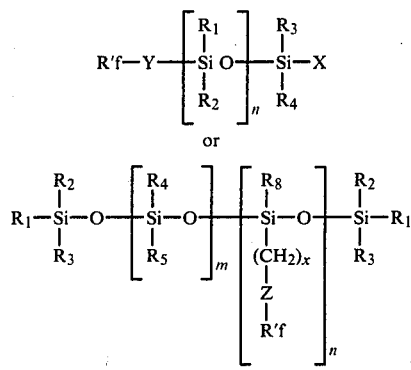

where R'f is a fluorinated alkyl group containing from 6 to 18 carbon atoms, Y is an ester group such that the Y—Si linkage is a carbon-silicon bond; X is an alkyl group containing from 1 to 6 carbon atoms, or Y—R'f; $R_1$ to $R_5$ are lower alkyl groups, which may be the same or different, containing up to 6 carbon atoms, $R_6$ is a hydrogen atom or a lower alkyl group containing up to 6 carbon atoms, x is an integer of from 2 to 5; Z is a divalent linking group; n is an integer of from 4 to 30; and m is 0 or an integer of from 1 to 30.

29. An electrical insulating material according to claim 28 in which Y represents a group of formula —CO.O—$(CH_2)_x$— in which x is an integer of from 2 to 5.

30. An electrically insulating material according to claim 28 in which the fluorine-substituted compound is a compound of the formula:

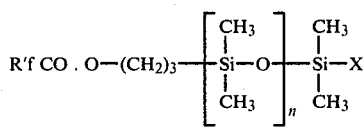

where X is $CH_3$ or $(CH_2)_3$—O.CO—R'f and n and R'f are as previously defined.

31. An electrical insulating material according to claim 1, in which the fluorine-substituted compound is a compound of the formula

$R'fCH_2.CH_2$—A where A is a silane or siloxane group linked to the fluorine-containing carbon chain by a C-Si bond, and R'f is a fluorinated alkyl group containing from 6 to 18 carbon atoms.

32. An electrical insulating material according to claim 1, in which the fluorine-substituted compound is a compound of formula:

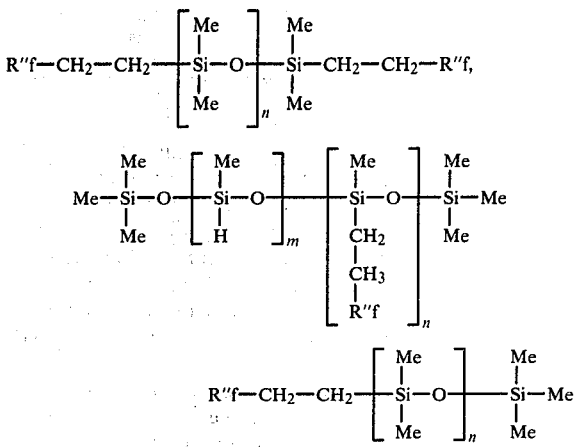

Where R"f is a fluorinated alkyl group comprising from 2 to 16 carbon atoms and m is 0 or an integer of from 1-30 and n is an integer of from 4-30.

33. An electrical insulating material according to claim 1, in which the fluorine-substituted compound is covalently bound to the polymeric material.

34. An electrical insulating material according to claim 33, in which the fluorine-substituted compound is an allyl ester of a fluoroalkanoic acid.

35. An electrical insulating material according to claim 1, in which the fluorine-substituted compound is present in an amount sufficient to give the surface of the insulating material an equilibrium contact angle with water of greater than 110°.

36. An electrical insulating material according to claim 1, in which the fluorine-substituted compound is present in an amount of from 0.01 to 2% based upon the weight of the polymeric material.

37. An electrical insulating material according to claim 1 in which the polymeric material is selected from a polyolefin or an olefin copolymer and the group having an affinity for the polymeric material comprises a carbon chain containing up to about 100 carbon atoms.

38. An electrical insulating material according to claim 37 in which said carbon chain comprises from 3 to 20 carbon atoms.

39. An electrical insulating material according claim 1 in which the polymeric material is selected from an acrylate or methacrylate polymer and the group having an affinity for the polymeric material is an ester, ether or amide group.

40. An electrical insulating material according to claim 1 in which the polymeric material is selected from epoxy resins, polyethers and epichlorohydrin rubbers and the group having an affinity for the polymeric material is selected from the groups containing epoxide or ether linkages.

41. An electrical insulating material according to claim 1 in which the polymeric material is polyurethane and the group having an affinity for the polymeric material is a group containing a urethane linkage.

42. An electrical insulating material according to claim 1 in which the polymeric material is a silicone polymer and the group having an affinity for the polymeric material comprises a siloxane linkage.

43. An electrical insulating composition according to claim 42 wherein the group having an affinity for the polymeric material contains up to about 40 siloxane linkages.

44. An electrical insulating material according to claim 42 in which the group having an affinity for the polymeric material contains from 4 to 30 siloxane linkages.

45. An electrical insulating material according to claim 42 in which the group having an affinity for the polymeric material contains at least one silicon atom bonded to carbon halogen, nitrogen or hydrogen.

46. A moulding or extrusion composition suitable for processing into an electrical insulating material according to claim 1.

47. A high voltage cable connection or termination protected by an electrical insulating material according to claim 1.

48. A high voltage electrical insulator comprising an electrical insulating material according to claim 1.

49. A high voltage electrical insulating polymeric material having an initial tracking voltage of at least 2.5kV as measured in accordance with ASTM D2303 comprising an anti-tracking filler and an erosion inhibiting non-ionic aliphatic fluorine-substituted compound selected from compounds soluble in said polymeric material, compounds miscible with said polymeric material, compounds resistant to leaching from said polymeric material and compounds that form a layer on said anti-tracking filler.

50. An electrical insulating material suitable for high voltage applications which is resistant to tracking and spark erosion comprising a polymeric material having incorporated therein an inorganic metal hydroxide anti-tracking filler and an erosion-inhibiting, hydrophobic, non-ionic fluorine-substituted compound, the compound having at least one fluorine-substituted aliphatic carbon chain linked to a group having an affinity for the polymeric material and/or the anti-tracking filler.

51. An electrical component protected by an electrical insulating material suitable for high voltage applications which is resistant to tracking and spark erosion comprising a polymeric material having incorporated therein an anti-tracking filler and an erosion inhibiting, hydrophobic, non-ionic, fluorine-substituted compound, the compound having at least one fluorine-substituted aliphatic carbon chain linked to a group having an affinity for the polymeric material and/or the anti-tracking filler.

52. An electrical insulating material suitable for high voltage applications which is resistant to tracking and spark erosion comprising a polymeric material having incorporated therein an anti-tracking filler and an erosion-inhibiting, hydrophobic, non-ionic, fluorine-substituted compound, the compound having at least one fluorine-substituted aliphatic carbon chain linked to a citrate group having an affinity for the polymeric material and/or the anti-tracking filler.

53. An electrical insulating material suitable for high voltage applications which is resistant to tracking and spark erosion comprising a polymeric material having incorporated therein an anti-tracking filler and an erosion-inhibiting, hydrophobic, non-ionic, fluorine-substituted compound, the compound having at least one fluorine-substituted aliphatic carbon chain linked to a group having an affinity for the polymeric material said group selected from the group consisting of laurate, stearate, amylate, $n-C_5H_{11}.O.CO-$, $n-C_{12}H_{25}O.CO-$, $n-C_{18}H_{37}O.CO-$, azelate and citrate.

54. An electrical insulating material suitable for high voltage applications which is resistant to tracking and spark erosion comprising a polymeric material having incorporated therein an anti-tracking filler and an erosion-inhibiting, hydrophobic, non-ionic, fluorine-substituted compound, the compound having at least one fluorine-substituted aliphatic carbon chain linked to a group having an affinity for the polymeric material selected from groups of the formula

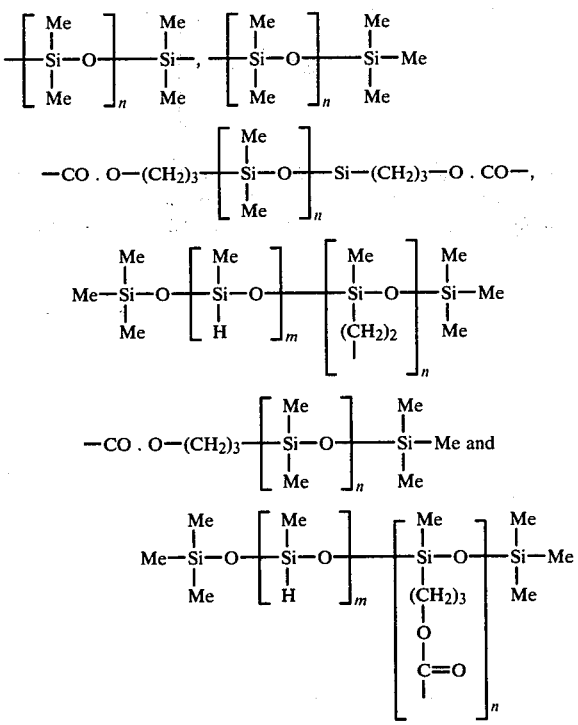

where m is 0 or an integer from 1 to 30, and n is an integer of from 4 to 30.

55. An electrical insulating material suitable for high voltage applications which is resistant to tracking and spark erosion comprising a polymeric material having incorporated therein an anti-tracking filler and an erosion-inhibiting, hydrophobic, non-ionic, fluorine-substituted compound, the compound having at least one fluorine-substituted aliphatic carbon chain linked to a group having an affinity for the anti-tracking filler which group is selected from the group consisting of hydrolysable silicone or siloxane groups.

56. An electrical insulating material suitable for high voltage applications which is resistant to tracking and spark erosion comprising a polymeric material having incorporated therein an anti-tracking filler and an erosion-inhibiting, hydrophobic, non-ionic, fluorine-substituted compound, said compound being an ester of a fluoroaliphatic alcohol and an aliphatic acid.

57. An electrical insulating material suitable for high voltage applications which is resistant to tracking and spark erosion comprising a polymeric material having incorporated therein an anti-tracking filler and an erosion-inhibiting, hydrophobic, non-ionic, fluorine-substituted compound, the compound having at least one fluorine-substituted aliphatic carbon chain linked to a group having an affinity for the polymeric material and/or the anti-tracking filler, said compound being selected from the group consisting of

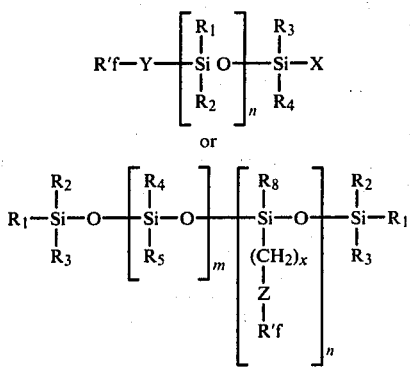

or where R'f is a fluorinated alkyl group containing from 6 to 18 carbon atoms, Y is an ester group such that the Y—Si linkage is a carbon-silicon bond, X is an alkyl group containing from 1 to 6 carbon atoms, or Y—R'f; $R_1$ to $R_5$ are lower alkyl groups, which may be the same or different, containing up to 6 carbon atoms, $R_6$ is a hydrogen atom or a lower alkyl group containing up to 6 carbon atoms, x is an integer of from 2 to 5; Z is a divalent linking group; n is an integer of from 4 to 30; and m is 0 or an integer of from 1 to 30.

58. An electrical insulating material according to claim 57 wherein Z is selected from ester, amide and ether linking groups.

59. A method of protecting an electrical component comprising electrically insulating the component using an electrical insulating material suitable for high voltage applications which is resistant to tracking and spark erosion comprising a polymeric material having incorporated therein an anti-tracking filler and an erosion-inhibiting, hydrophobic, non-ionic, fluorine-substituted compound, the compound having at least one fluorine-substituted aliphatic carbon chain linked to a group having an affinity for the polymeric material and/or the anti-tracking filler.

60. A method according to claim 59, in which the electrical insulating material is recoverable and is recovered so as to form a close fit over the electrical component.

* * * * *